UNITED STATES PATENT OFFICE.

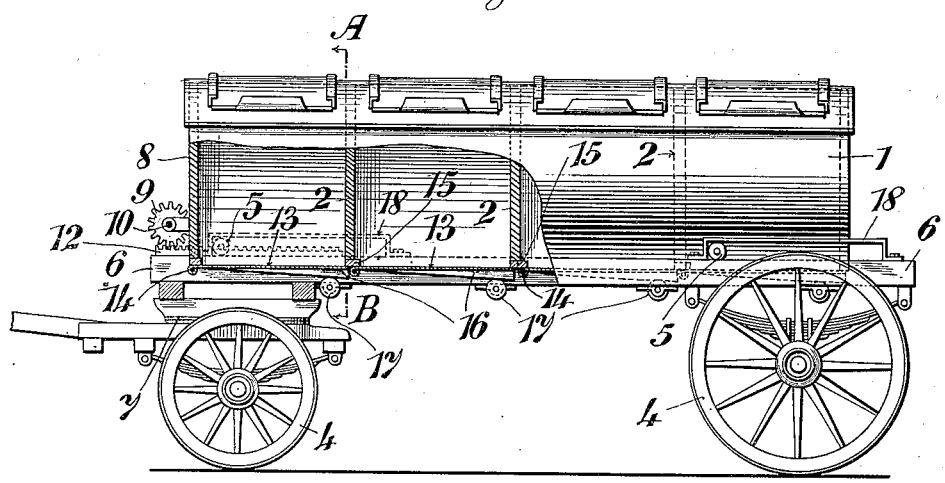
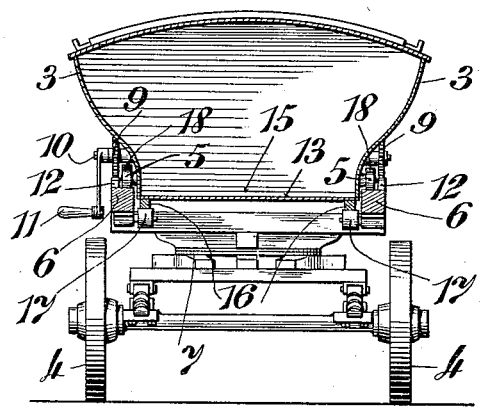

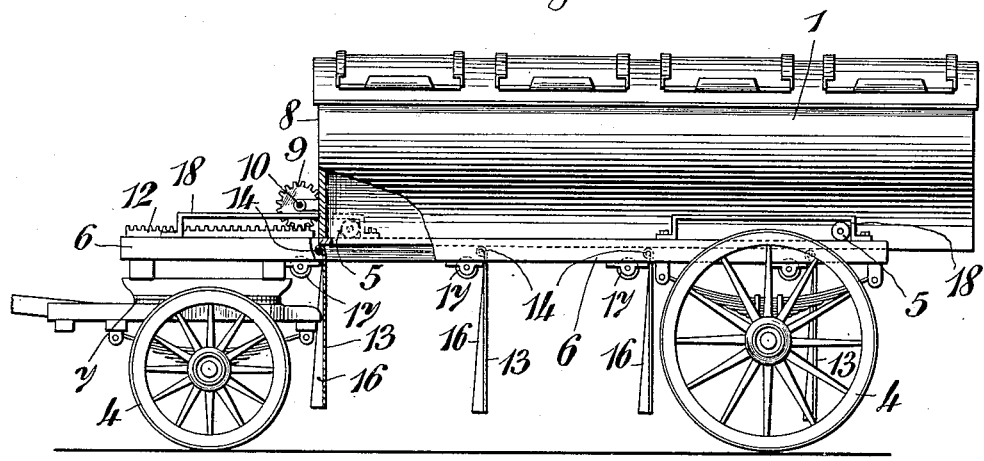

JACOB OCHSNER, OF ZURICH, SWITZERLAND.

DUMPING-WAGON.

1,101,085.  Specification of Letters Patent.  Patented June 23, 1914.

Application filed December 8, 1910. Serial No. 596,321.

*To all whom it may concern:*

Be it known that I, JACOB OCHSNER, a citizen of the Republic of Switzerland, residing at Müllerstrasse No. 56, Zurich, Switzerland, have invented new and useful Improvements in Dumping-Wagons; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to dumping wagons and more especially to that type in which the bottom of the wagon body consists of sections mounted to turn about axles disposed at right angles to the length of the body. In wagons of this type heretofore the body is fixed to the frame and the bottom sections are moved by beams displaceably mounted on the frame. One of the drawbacks of such a construction is that when the body extends over the front axle the contents of the wagon, when dumped, falls on the front axle.

According to my invention the bottom sections are opened and closed by longitudinally displacing the body of the wagon on the frame. This permits the wagon body to extend over the front axle and by moving the body backward the contents when dumped, will not fall on the front axle.

A wagon embodying the said improvement is shown in the accompanying drawing in which:

Figure 1 is a side elevation of the wagon, partly in section. Fig. 2 is a cross section on line A—B of Fig. 1. Fig. 3 is a side elevation, partly in section, showing the wagon body displaced.

The wagon body may be divided into several compartments by means of transverse partitions 2. The sides 3 of the wagon body are bent so that its upper part projects beyond the wheels 4, while at the bottom it is narrowed to make room for the rollers 5 by means of which it is supported on beams 6 of the wagon frame. The stroke of the rollers 5 is limited by checks 18.

7 designates the front bogie over which the front part of the wagon body projects. The stroke of the rollers 5 permits the wagon body to be shifted backward until its front wall 8 is behind the bogie 7 (Fig. 3).

This is effected by means of two pinions 9 on a shaft 10 carried on the wagon body 1 which shaft may be rotated by a crank 11. The pinions 9 mesh with racks 12 on the frames 6.

Each compartment of the wagon body 1 is closed at the bottom by a trap door 13 which are linked by hinges 14 to transverse pieces 15 of the wagon body. The trap doors have wedges 16 along the edges which are at right angles to the hinges. By means of these wedges the doors are supported on rollers 17 which are carried on the beams 6. When by turning the crank 11 the wagon body is moved from the position shown in Fig. 1 into that of Fig. 3, the trap doors are no longer supported by the rollers and open in consequence, so that the contents of the wagon fall out behind the front bogie.

The partitions 2 may be dispensed with. They are only used in wagons for materials which easily get clogged, such as household refuse.

The arrangement of the wagon body so that it extends over the front bogie is advantageous because thereby the load is equally distributed on the axles of the cart.

The wedges 16 serve to tightly hold the trap doors while the rollers 17 serve as bolts so that separate locking means, such as bolts or springs, are unnecessary.

I claim—

1. In a dumping wagon, a non-slidable frame, carried by and in fixed relation to the forward bogie and axle of the rear wheels, a body slidably mounted on the frame, means to prevent the body from tipping on the frame, fall doors behind one another, one end of each door being pivotally mounted on the body, and forming the bottom of the latter, supports fast on the frame for holding the doors closed, the first support being arranged behind the bogie and the axis of the first door being arranged in front of the bogie.

2. In a dumping wagon, a non-slidable frame carried by and in fixed relation to the forward bogie and axle of the rear wheels, a body slidably mounted on the frame, means to prevent the body from tipping on the frame, fall doors behind one another, one end of each door being pivotally mounted on the body, and forming the bottom of the latter, rollers acting as supports and rotatably mounted in the frame for holding the doors closed, the first roller being arranged behind the bogie, and the axis of the first door arranged in front of the bogie, said doors having closing strips on opposite sides extending from their axes like uniformly inclined wedges, lying on the rollers.

In testimony that I claim the foregoing as my invention, I have signed my name in presence of two subscribing witnesses.

JACOB OCHSNER.

Witnesses:
HERMAN KNITTEL,
ARTHUR J. BUNDY.